(12) United States Patent
Bottacco et al.

(10) Patent No.: US 7,004,748 B2
(45) Date of Patent: Feb. 28, 2006

(54) FIXING DEVICE FOR MOULDS

(75) Inventors: Igor Bottacco, Feltre (IT); Jader Pavanetto, Mestre (IT); Matteo Zoppas, Fontanafredda (IT)

(73) Assignee: S.I.P.A. Societa' Industrializzazione Progettazione Automazione S.p.A., Veneto (IT)

( * ) Notice: Subject to any disclaimer, the term of this patent is extended or adjusted under 35 U.S.C. 154(b) by 305 days.

(21) Appl. No.: 10/474,876

(22) PCT Filed: Apr. 5, 2002

(86) PCT No.: PCT/EP02/03778

§ 371 (c)(1),
(2), (4) Date: Oct. 10, 2003

(87) PCT Pub. No.: WO02/083394

PCT Pub. Date: Oct. 24, 2002

(65) Prior Publication Data

US 2004/0131719 A1 Jul. 8, 2004

(30) Foreign Application Priority Data

Apr. 11, 2001 (IT) .......................... RM2001A0200

(51) Int. Cl.
*B29C 45/64* (2006.01)
(52) U.S. Cl. .................... 425/577; 425/595; 425/451.9
(58) Field of Classification Search ............ 425/451.9, 425/533, 577, 595; 164/341
See application file for complete search history.

(56) References Cited

U.S. PATENT DOCUMENTS

| 2,363,107 | A | * | 11/1944 | Young ..................... 425/451.9 |
| 4,148,353 | A | | 4/1979 | Quere |
| 4,204,825 | A | * | 5/1980 | Furnas .................... 425/451.9 |
| 4,248,583 | A | * | 2/1981 | Hedke et al. ............ 425/451.9 |
| 4,370,112 | A | * | 1/1983 | Sorbier .................... 425/451.9 |
| 4,425,091 | A | * | 1/1984 | Prince ........................ 425/595 |
| 4,696,637 | A | * | 9/1987 | Riviere et al. ............. 425/595 |
| 4,828,478 | A | * | 5/1989 | Hehl .......................... 425/595 |
| 5,114,335 | A | * | 5/1992 | Tinsley ...................... 425/595 |
| 6,264,458 | B1 | * | 7/2001 | Marcuz et al. ........... 425/451.9 |
| 6,918,754 | B1 | * | 7/2005 | Albrecht .................. 425/451.9 |

FOREIGN PATENT DOCUMENTS

| EP | 0209413 | 9/1986 |
| GB | 963971 | 7/1964 |
| GB | 2158389 | 11/1985 |
| WO | WO 02/083394 | 10/2002 |

\* cited by examiner

*Primary Examiner*—James P. Mackey
(74) *Attorney, Agent, or Firm*—Richard L. Sampson, Esq; Sampson & Associates, P.C.

(57) ABSTRACT

A fixing device for moulds for plastic articles, where a pair of half-moulds (3, 4) in which a force plug (11) can be inserted, comprises at least one tie rod (6) for keeping the two half-moulds in a closed position, the said tie rod being hinged, at one end, to the mobile half-mould and having a second end of a hammer-headed shape which hooks to two gripping jaws (60, 61). The tie rod (6) is hinged to a connecting rod which rotates on a pivot fixed to the resting base (14), which, in the movement of rotation, sets the tie rod (6) along the line corresponding to the centroid of the pressure forces produced during the moulding operation.

13 Claims, 6 Drawing Sheets

FIXING DEVICE FOR MOULDS

This application claims priority to International Patent Application Serial No. PCT/EP02/03778 filed on 5 Apr. 2002, claiming priority to Italian Patent Application Serial No. RM2001A000200 filed on 11 Apr. 2001.

FIELD OF THE INVENTION.

The present invention relates to a fixing device for moulds, in particular for a press for moulding plastic articles, such as parisons for bottles or other containers made of PET, and in particular relates to a device used under presses not provided with guide pins for the connection and sliding of the half-moulds.

PRIOR ART

In presses commonly used for injection moulding of plastic or metallic articles, the two halves of the mould, i.e., the fixed half-mould and the mobile half-mould, are generally open and subsequently brought together and kept under pressure one against the other by a toggle mechanism or by a hydraulic or pneumatic piston which causes sliding along guide bars or elements.

The overall dimensions of the guide elements, which generally number four, present considerable disadvantages since they markedly reduce the space available for installing the two half moulds on the two plates, i.e., the fixed plate and the mobile plate, for carrying the half moulds. In addition, the guide elements also constitute an obstacle to the passage of devices for extracting and picking up the moulded articles from the open mould.

Presses have been built that are without guide elements, with the aim of overcoming the above problems, for example, presses with a C-frame, where the half-moulds are mounted on the two ends of the C, and the mobile half-mould is brought up to the fixed one and kept under pressure against it by means of a hydraulic cylinder. Disadvantages of solutions of this sort lie in the fact that, in order to keep the two half-moulds closed notwithstanding the considerable pressures inside the mould. The C-structure must be considerably oversized for it not to be deformed when the hydraulic cylinder is put under pressure and closes the half-moulds. In this type of press, the hydraulic cylinder, which performs both the function of bringing the half-moulds up together and of keeping them under pressure when closed, exerting on them a force which frequently amounts to several dozens of tonnes (several dozens of thousands N) also proves to be oversized and needs to have a very long travel that is at the same time able to withstand high pressures. The operation of the press thus requires the use of large amounts of hydraulic fluid.

Consequently, also the pump of the hydraulic circuit in such a press needs to be of large dimensions. In addition, the sizing of the structure of the C-shaped frame is not sufficient to prevent the latter from being deformed and the centroidal line of the pressure forces acting on the half-moulds from becoming arched. This may make it necessary to adopt particular technical solutions of compensation, which for example enable the mobile half-mould to rotate slightly and follow the rotation of the fixed half-mould resulting from the deformation of the frame. As a whole; however, a press of this sort is considerably heavy, massive and costly.

Again, in the particular field of injection moulding of parisons from which containers, such as bottles or jars for foodstuffs are produced by blow-moulding, or also for the moulding of plastic articles in general, amongst the recurrent problems is the need to reduce machine-cycle time. Known solutions to the above problem consist in increasing the number of injection cavities present in the moulds and in picking up the moulded parisons, fitted or otherwise on the force plugs or plungers of the mould complementary to the internal cavity of the parisons, and bringing the parisons to the outside of the mould to complete their cooling. In this way, there is a reduction in the cooling time of the moulded products inside the press and an increase in the rate of moulding of the press. The transfer of the parisons or of other moulded objects outside the press notoriously entails various problems of which one regards the fact that the shorter the cooling time of the parisons in the mould, the more they are in a soft state and subject to damage during the operation of gripping and handling, whether with grippers or with other possible means for picking them up from the force plugs. Another problem lies in the thermal deformations which occur in the course of excessively fast cooling if the parisons are not fitted on a force plug. There exist various solutions to these problems in the state of the art, all of which are more or less complicated.

FR-A-0209413 discloses a fixing device for moulds, in particular for a moulding press for moulding plastic articles, comprising a supporting frame at least one pair of half-moulds), which define a corresponding surface for mutual connection, and in which there is defined a closing and opening direction of said half-moulds said pair forming, in a connected position, a respective cavity for moulding said articles. Means in form of a closed frame are provided for keeping the two half-moulds in a position of connection counteracting the pressures produced inside said at least one moulding cavity.

SUMMARY OF THE INVENTION

One purpose of the present invention is to solve the aforesaid problems by providing a press structure that is lighter and less complex than the solutions known to the state of the art, by means of a fixing device for moulds of a new structure.

A second purpose of the present invention is to provide a system for unloading the moulded products from a press, which is simple and fast, thus guaranteeing shorter cycle times.

A further purpose is to simplify the structure of the injection mould for parisons of cylindrical containers, which is made up of just two half-moulds that are separated along a median plane.

The above problems are solved by a device for injection moulding having the characteristics according to Claim 1.

One advantage that may be achieved with a device in accordance with the present invention, besides the solution of the above-mentioned problems, is that the injection press is of very contained dimensions and may be set according to the most convenient orientation, whilst occupying a smaller space.

The resultants of the injection pressures are discharged on a tie rod acting in an almost centroidal direction with respect to the forces resulting from the injection, whilst the presence of massive external containment structures is not required.

The structure of the press does not provide for the presence of guide bars, and this leaves space free for the passage of devices for unloading the moulded products. A particular solution for the production of hollow cylindrical parisons for moulding defines a very simple system for extraction of the parisons from the mould, where the parisons cool off for the most part outside the mould while they are still fitted on the moulding force plugs: In this way, the cooling time in the mould is reduced to a minimum, so preventing thermal deformations being produced in the parisons due to an excessively fast cooling and preventing the problems connected to the gripping of the parisons by means of transferring grippers or other similar means.

The actuators used for the travel of approach may be advantageously fast actuators, either electrical or pneumatic ones, of limited power and consumption, since they are elements distinct from the cylinder producing the closing force on the mould. This force may therefore be produced by means of an element having an adequate force, but very small displacements and consumption levels.

Further embodiments are defined in the dependent claims.

LIST OF THE FIGURES

Further advantages that may be achieved with the present invention will become more apparent, to the skilled person, from the following detailed description of a non-limiting example of a particular embodiment, with reference to the following figures, in which.

DETAILED DESCRIPTION

Figure 4A:
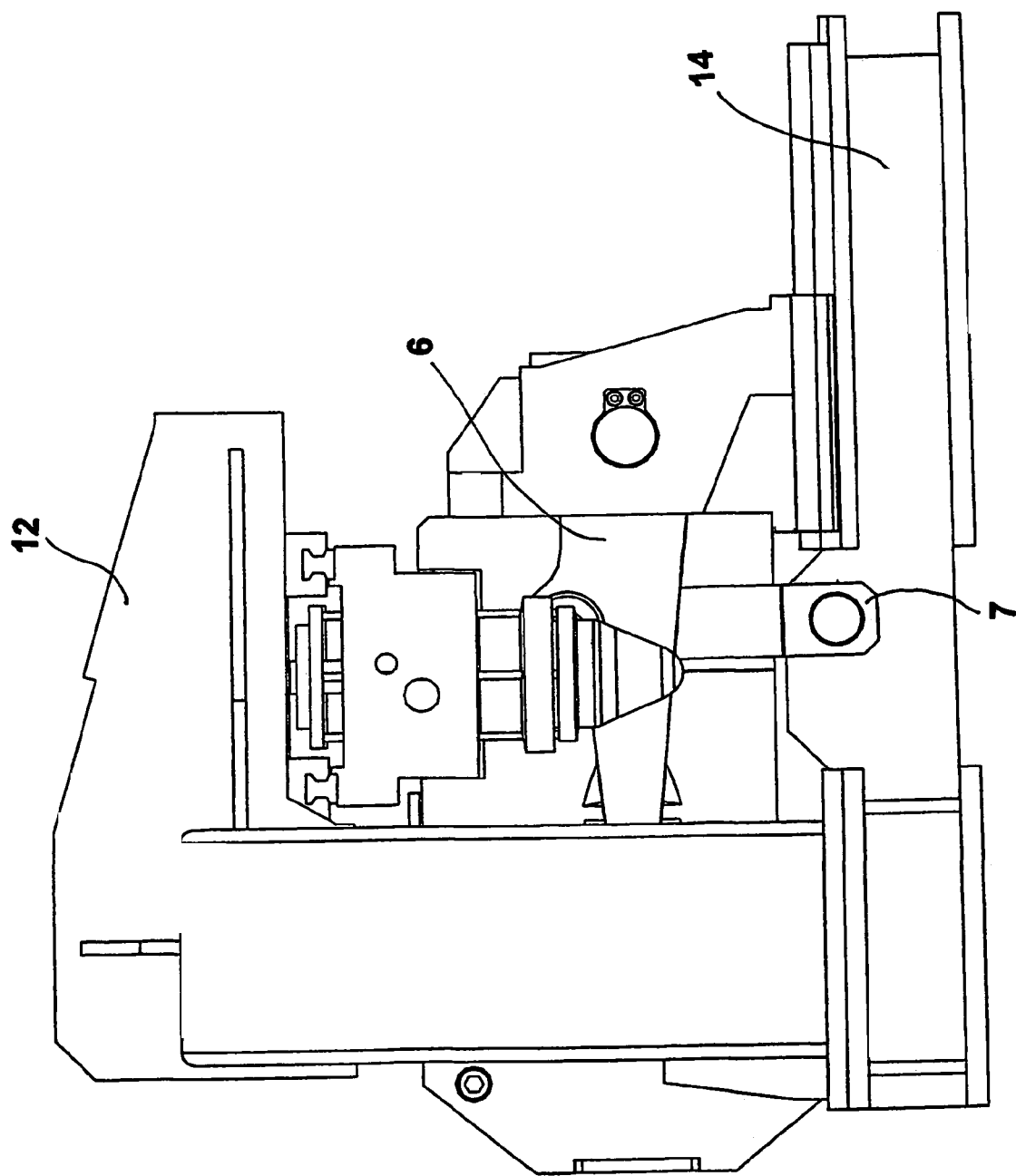
FIGS. 4a, 4b and 4c are three schematic side views of an opening sequence of the mould of the device of FIG. 1.

The attached figures are schematic representations of a preferred example of an embodiment of a device for closing and opening half-moulds for a press for injection moulding without guide pins, according to the present invention, consisting of a metal frame 14 which supports the other component elements, a slide of the surface of the mobile press 1 on which there is in turn fixed the mobile half-mould 3, a support for the surface of the fixed press 2, on which there is in turn fixed the non movable half-mould 4, and a transporting device, defined hereinafter also as force-plug-carrying bar 10, driven by a force-plug-carrier movement device 12, which is more clearly visible in FIG. 4a.

The following description refers to an embodiment with a single moulding cavity, but it is clearly applicable to the case of moulds with a number of cavities set side by side.

The mobile slide 1 of the surface of the press, sliding along its guides, performs the travel of approach and recession of the mobile half-mould 3 with respect to the fixed half-mould 4, which is connected, in an integral way, or preferably in a sliding way, to the surface of the fixed press 2, i.e., the surface of closing and opening of the mould as a whole.

According to a basic characteristic of the present invention, the two half-moulds are kept in a closed position by a tie rod provided with a hammer-shaped head which is gripped by closing jaws 8, and in the following description is defined as tie rod for closing a device which opposes the internal pressure of injection moulding that would tend to open up the half-moulds.

The moulding cavity of the mould is defined in addition by one or more internal force plugs 11. A plurality of force plugs 11 are fixed on the force-plug-carrying bar 10. In the embodiment described just one force plug is each time closed in the moulding cavity, causing the force-plug-carrying bar 10 to translate at each opening cycle of the mould by the distance of one step.

The surface of separation of the pair of half-moulds 3 and 4, which have complementary contact surfaces, when the mould is closed, is defined as surface of mould division.

Preferably, the surface of joining of the two half-moulds is set in such a way that it lies substantially on an axial surface of the parison; i.e., the mobile half-mould 3 has a movement of opening in a direction transverse to the axis of the force plug.

The system of transverse opening is preferred, not only on account of the advantages for a fast handling of the moulded products extracted from the mould and on account of the combination with the system of containment of the resultant of the injection pressures on the force plug 11, as will be described in greater detail in what follows, but also because it enables, as compared to the system of opening in the direction longitudinal to the axis of the force plug, elimination of the so-called lips, i.e., those parts of the injection mould which surround the collar of the parison and which are made separately from the half-moulds which surround the body of the parison. The lips are delimited by a surface of separation situated at the height of the collar of the parison, i.e., of the maximum radial projection of the neck present in parisons for blow-moulding of bottles, jars and other types of containers, typically ones made of PET. The lips generally have small dimensions, and it is of critical importance to provide inside them channels of sufficient capacity for the water for cooling of the mould, this fact being even more critical because the region of the thread of a parison must be the one that is cooled better and faster, in order to limit the phenomena of crystallization of the PET which would render it non-transparent, and also because, upon opening of the mould, it will be the part by which the parison is gripped in the various operations of automatic handling and movement.

The elimination of the lips according to the solutions referred to above enables a greater freedom in providing cooling channels of adequate dimensions also in the region of the thread of the parison.

In the closed, working, position of the half-moulds, the pressure of the fluid plastic inside the injection mould would tend to expel the force plug from the mould, and hence, in order to counter this phenomenon, each force plug 11 is provided with an undercut 110, which rests against a surface 15 made in the internal cavity of the half-moulds, in such a way that the resultant of the injection pressures on the force plug 11 is discharged inside the half-moulds and in a direction perpendicular to the direction of opening of the mould.

Thanks to the above solution and to the presence of the pair of closing tie rods 6, it is possible to keep the mould closed during the injection process without providing external guide pins and heavy external containment structures, such as the C-shaped structures of the state of the art.

Advantageously, one part of the force plug 11 protrudes outside the closed mould and is fixed to the force-plug-carrying bar 10. This enables fast extraction of the moulded parisons from the injection cavities, according to a mode of operation which will be described in greater detail hereinafter.

Preferably, the two closing tie rods 6, which are hinged symmetrically on two opposite sides of the mobile half-mould, in the mould-closed position, shown in FIG. 4a, set themselves parallel and aligned to the resultant of the pressures on the half-moulds, i.e., to the axis of the pressures of the mould.

Figure 4B:
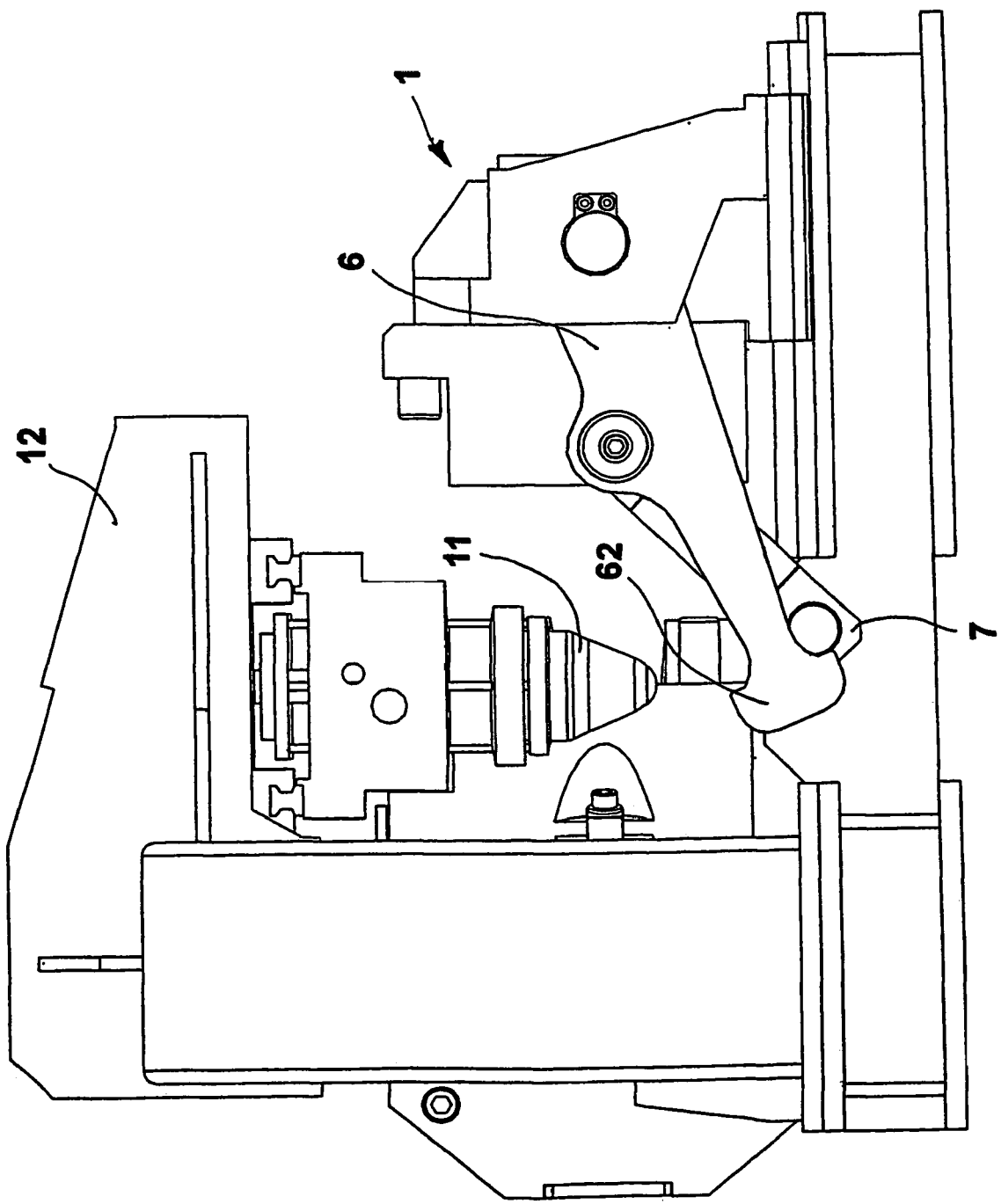
Figure 4C:
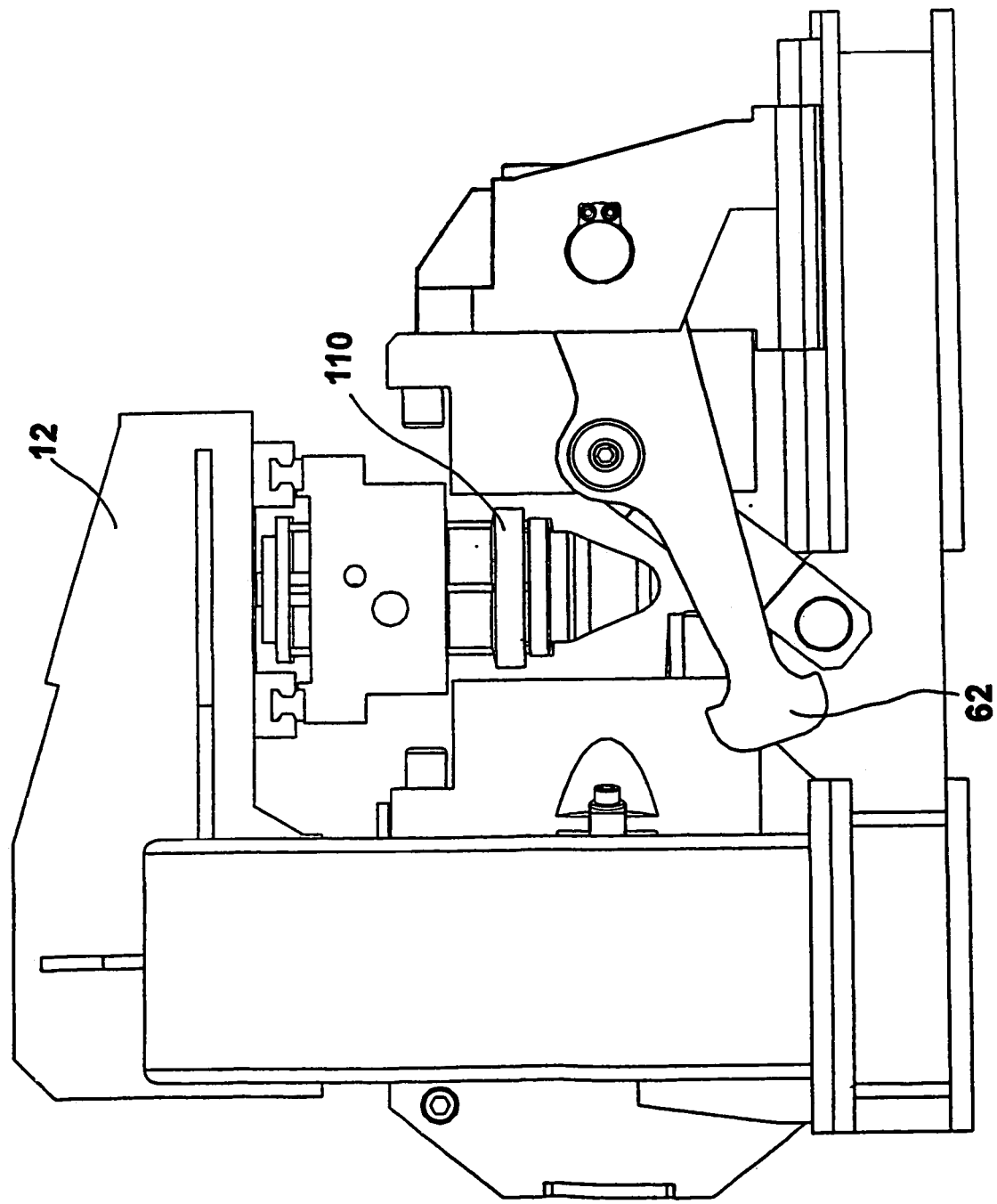

Each closing tie rod 6 is moved by a connecting rod 7, which is hinged on the supporting frame 14 and is shaped and positioned in such a way that it causes the tie rod 6 to rotate towards a lowered position, as is represented in FIGS. 4b and 4c, when the mould is opened and the mobile plate 1 is at the maximum distance from the fixed mould-carrying plate 2, clear of the force-plug-carrying bar 10 and of the force plugs 11. The force plugs are made to translate in a direction longitudinal to the force-plug-carrying bar 10 so extracting the moulded parison from the moulding cavity. Said parison is extracted fitted on the corresponding moulding force plug 11.

The connecting rods 7 may be either driving ones, and in this case actuate the sliding of the slide of the surface of the mobile press 1, or else driven ones, the slide of the surface of the mobile press 1 being driven by another motor. In either case, advantageously the motors which drive the travel of approach of the slide 1 to the surface of the fixed press 2, i.e., to the half-mould 4 connected thereto, are electrical motors, or else pneumatic or hydraulic actuators independent of the tightening cylinder 5, which will be described in what follows.

Figure 1:
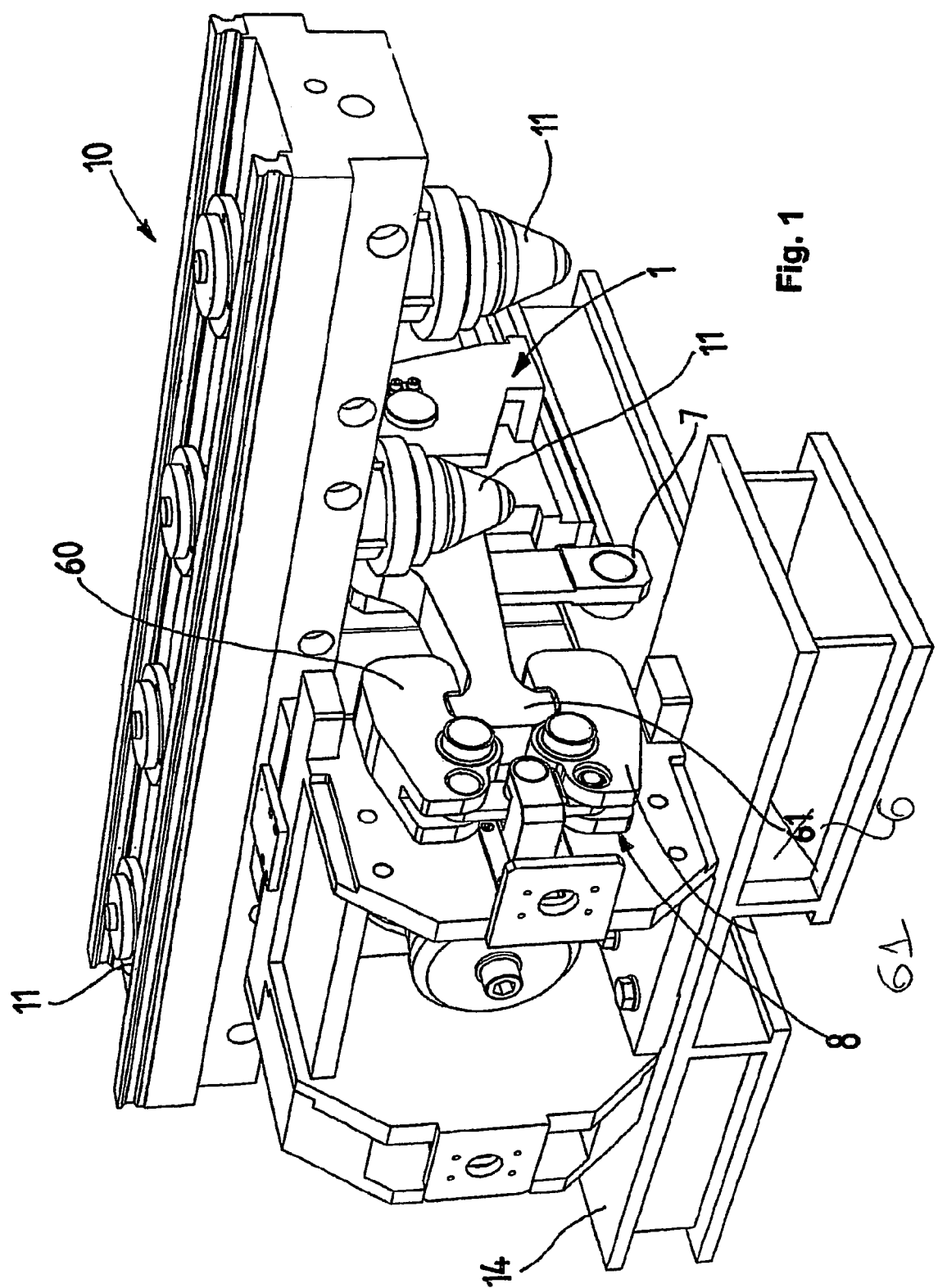
FIG. 1 is a rear three-dimensional schematic view of an embodiment of a device according to the present invention, with the mould in a closed position.
Figure 2:
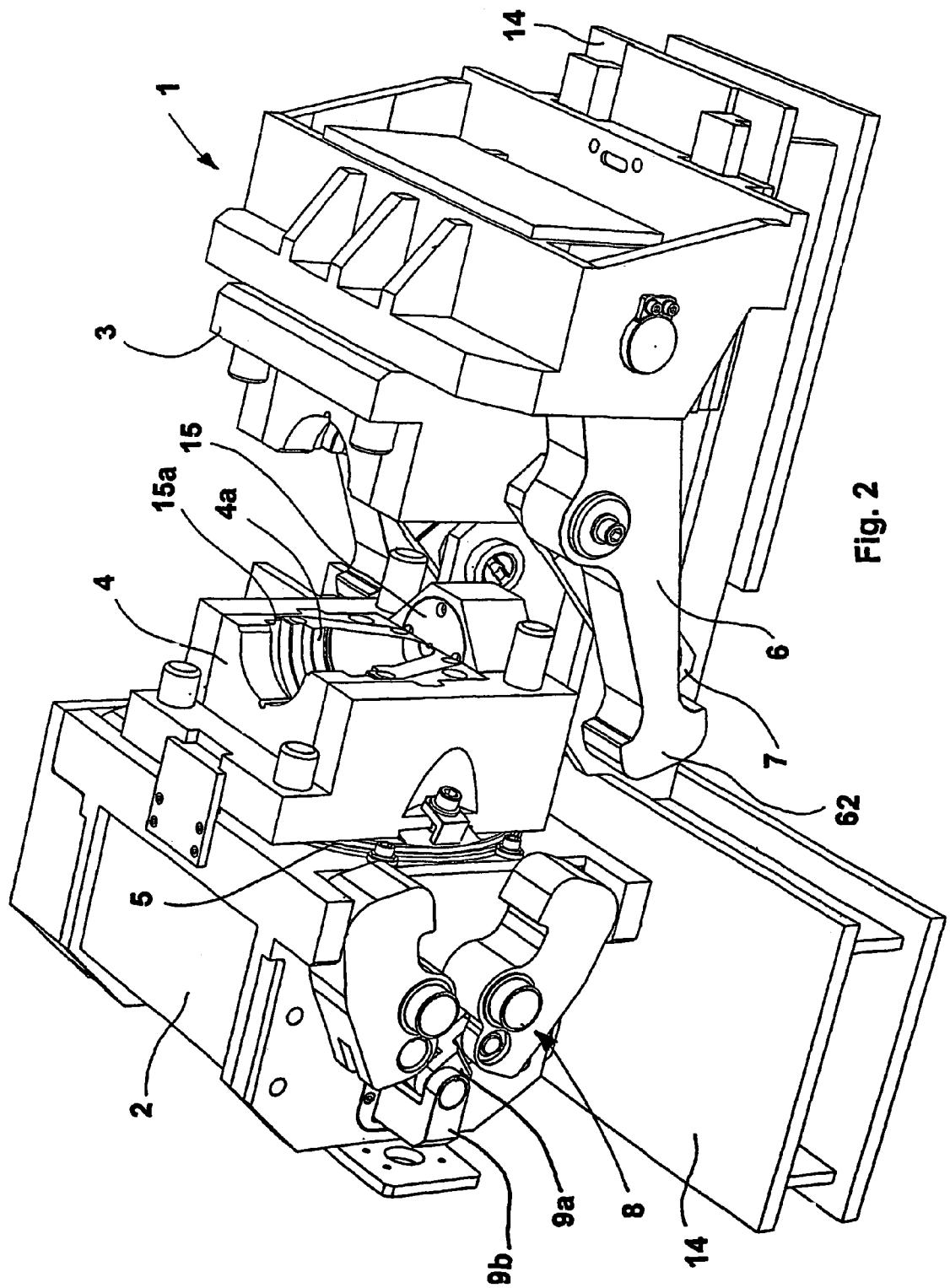
FIG. 2 is a front three-dimensional schematic view of the device of FIG. 1, with the mould in an open position, in which one element is not shown.

The closing tie rods 6 are blocked, in the mould-closed position, each by means of a hooking device 8, shown in detail in FIG. 2, which engages in the end 62 shaped like the head of a hammer of each tie rod 6. In the embodiment represented in the figures, the hooking device 8 is made with two jaws 60 and 61, each of which is opened and closed by a toggle mechanism 9, comprising the connecting rods 9A and the control element 9B connected to the connecting rods by a central hinge and operated by a jaw-actuating motor, not shown in the figures.

Figure 3:
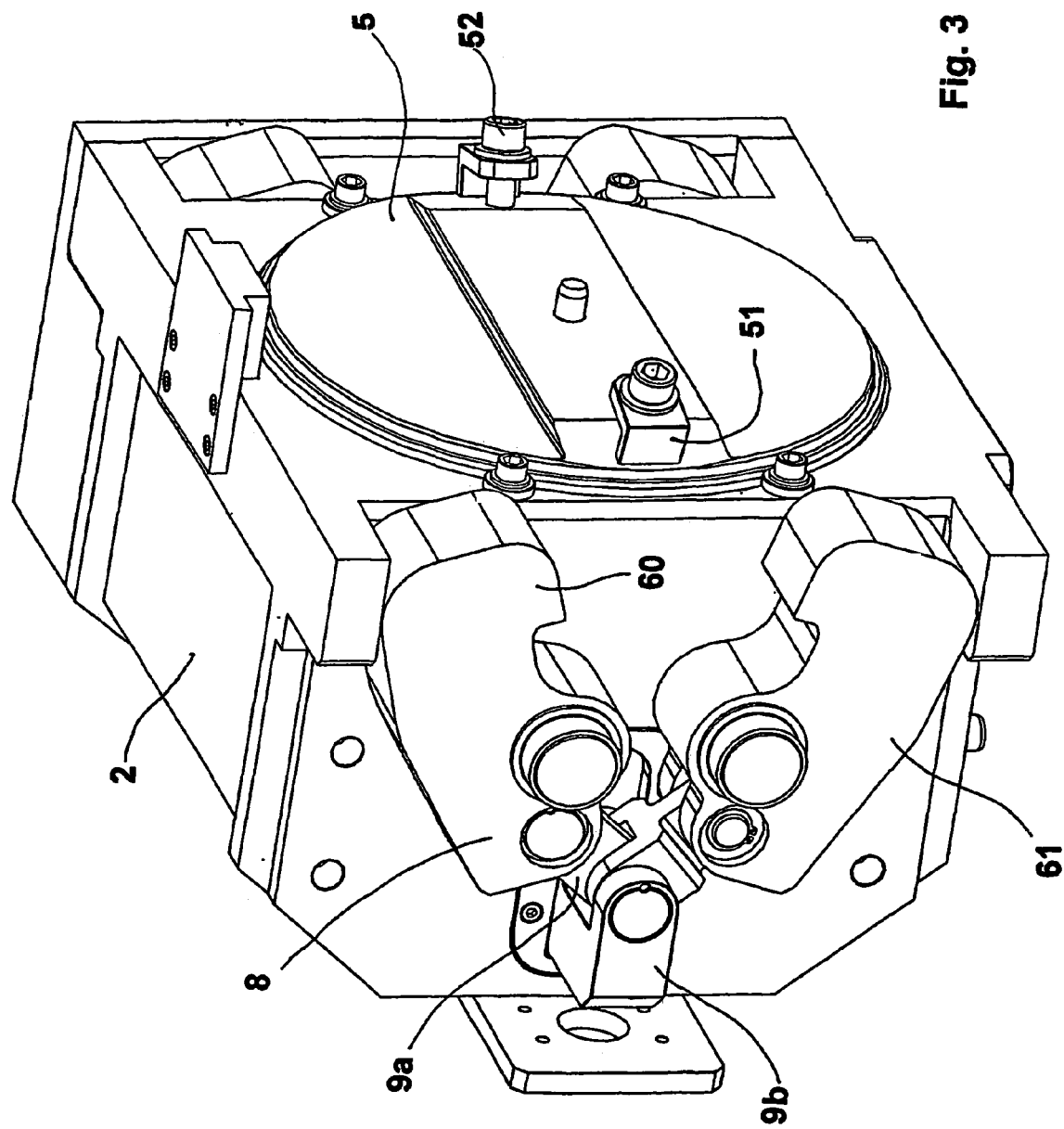
FIG. 3 is a front three-dimensional schematic view of some elements of the device of FIG. 1.

FIG. 3 represents the subassembly of the support for the surface of the fixed press 2. On the front side there is a tightening cylinder 5, for example a single-acting pneumatic cylinder, on which the half-mould 4 may be fixed with the clamps 51 and 52, which are in themselves known. The half-mould 4 has the possibility of sliding for a stretch sufficient for eliminating the clearance present at the surface of separation of the two half-moulds after blocking of the tie rods 6 in the hooking device 8.

Advantageously, the tightening cylinder 5 has a travel as short as possible and a section of the piston such as to provide adequate pressure on the half-mould 4, when the mould is closed, so as to compensate for the gap that may have remained between the two half-moulds along the surface of division of the half-moulds 3 and 4. The presence of the above gap enables closing and opening of the mould with a non-interference fit, without having to jam the half-moulds together, eliminating the residual clearance between the resting surfaces of the jaws 60, 61 with the hammer-headed shaped ends 62 of the tie rods 6. The cylinder 5 further applies the useful pre-loading force for preventing opening of the mould during injection.

In the example described, the pressure is indicatively about 10–20 tonnes ($10-20 \times 10^4$ N), and the travel of the cylinder is 1–2 mm. The possibility of having the pneumatic pressure cylinder 5 with such a short travel results from the use of the independent electric motors referred to above, which are distinct from the cylinder 5, in order to bring about the travel of approach of the mobile slide 1. In this way, the travel of the pressure cylinder 5 may be reduced, as in the particular example described here, from several decimeters or even metres—according to the dimensions of the moulded product—to values of even just a few millimeters. This leads to a faster approach between the two surfaces of the press, performed with actuators having lower consumption levels, and using a pump for filling the pressure cylinder 5 that is considerably smaller than in the solutions known from the prior art, which use one and the same hydraulic actuator both for carrying out the travel of approach of the half-moulds and for exerting the tightening pressure.

The residual play between the resting surfaces of the jaws 60, 61 and the hammer-shaped ends 62 of the tie rods 6 before application of the thrust is necessary for enabling opening and closing of the jaws 60 and 61.

There now follows a description of a preferred mode of operation of the device described above.

The connecting rods 7 operate the slide of the surface of the mobile press 1, whilst actuators bring the half-mould 3 up to the half-mould 4; the driving motors for operating the clamping devices 8 open the jaws 60 and 61 and re-close them around the hammer-headed shaped end 62. The cylinder 5 is set under pressure and applies the tightening force on the closed mould. The molten plastic, or other material to be injected, for example a metal, is injected into the internal cavity of the mould. After an appropriate cooling time, corresponding to the minimum necessary for carrying out the operations hereinafter described, the hooks 8 are opened, and the mobile half-mould 3 is moved away from the fixed half-mould 4. The tie rods 6 are rotated downwards as a result of the rotation of the connecting rods 7, as described above. Next, as represented in FIG. 4c, the handling device of the force-plug-carrying bar 12, not shown in detail in this figure, causes translation of the force-plug-carrying bar 10 parallel to the direction of opening of the half-mould 3 by a half-step and extracts the moulded parison from the injection cavity, the said parison being still fitted on the corresponding force plug 11. Next, the handling device of the force-plug-carrying bar 12 causes translation, by the length of one step, of the force-plug-carrying bar 10 longitudinally to itself, and presents a subsequent force plug 11 in front of the injection cavities 3a and 4a. By carrying out the sequence described in reverse, the mould is closed by bringing the half-mould 3 up to the half-mould 4 by means of an actuator and by closing the hooks 8. Next, the half-mould 4 is pushed against the half-mould 3 by means of the pressure exerted by the cylinder 5, after which a new injection may be performed.

Advantages of the aforesaid device are that the parison may be extracted when it is still very plastic and hot, and the cooling process can be completed outside the injection mould, which is thus available in shorter times for carrying out another injection operation, with consequent saving in energy. In addition, the movements of translation of the force-plug-carrying bar in a plane parallel to the direction of mould opening may be performed very quickly, and it is possible to free the undercut 110 between the force plug 11 and the half-cavities 3a and 4a with just two movements. All this enables a considerable increase in the cycle time of the injection press. The parisons can complete their cooling in the air, remaining fitted on the force plugs or on some other type of cooling devices external to the mould, without any delay in their use for the next injection cycle. Next, the parisons can be unloaded from the force plugs in various known manners. As emerges from the foregoing description, the device for closing and opening the moulds renders the presses simpler and more compact.

Preferably the device is positioned with both the force-plug-carrying bar and the mould-opening travel in a horizontal plane. To do this, in the case of presses with horizontal plasticization screw, it is sufficient to adopt a hotchannel chamber/hot chamber with elbow, which causes the injected plastic material to come out vertically.

Without departing from the scope of the present invention, the embodiment described above may undergo numerous variations. For example, the hooking devices 8 may be replaced by a hook with a single and rigid jaw which has a shape complementary to the hammer-headed shaped end 62 of the closing tie rod and which clamps or releases said hammer-headed shaped end 62, translating in the direction of the width of the support of the surface of the fixed press 2. The shape of the hammer-shaped ends 62 of the closing tie rods may be variously modified, or else the hammer-shaped tie rods 6 may each be split up into a pair of hooks with a single hooking tooth.

The above-mentioned device may be used for fixing moulds with more than one cavity, and in this case it is possible to provide a larger number of tie rods 6 interspaced with each cavity or else between a larger number of cavities, for example two or three cavities, or else an appropriate number chosen on the basis of structural considerations or considerations of some other type.

What is claimed is:

1. A fixing device for moulds, in particular for a moulding press for moulding plastic articles, comprising a supporting frame (14), at least one pair of half-moulds (3,4), which define a corresponding surface for mutual connection, and in which there is defined a closing and opening direction of said half-moulds (3,4) said pair forming, in a connected position, a respective cavity for moulding said articles, and being characterised in that it comprises at least one tie-rod element (6) for keeping the two half-moulds (3, 4) in a position of connection counteracting the pressures produced inside said at least one moulding cavity, said at least one tie-rod element (6) being hinged at one first end to one of said two half-moulds (3) and being provided, at one second end, with first hooking means (62) designed to be gripped in a reversible way by second hooking means (8, 60, 61) solidarity fixed to said frame (14), and in that a corresponding force plug (11) which is set substantially perpendicular to said direction of closing and opening, is suitable for being inserted in said respective cavity for moulding said articles.

2. Device according to claim 1, in which said first hooking means (62) have a hammer-headed shape.

3. Device according to claim 2, in which said second hooking means (8) for said second end of said at least one tie-rod element (6) comprises two jaws (60, 61) provided with motor means (9a, 9b) for opening and/or closing.

4. Device according to claim 3, in which said at least one tie-rod element (6) is hinged, in a portion intermediate to its said first and second ends, to a first end of a corresponding connecting rod (7), said connecting rod being hinged, at its second end, to said frame (14) and being designed to rotate through an arc of a circle during the movement of connection of the half-moulds (3, 4) of said at least one pair.

5. The device according to claim 4, in which said connecting rod (7) in said movement of rotation sets said at least one tie-rod element (6) substantially along a line defining the centroid of the pressure forces produced during the moulding operation.

6. The device according to claim 5, in which said connecting rod (7) in said movement of rotation sets said at least one tie-rod element (6) in a position further away from said force plug (11) when the half-moulds (3, 4) of said at least one pair are in an open position.

7. The device according to claim 6, in which said tie-rod element (6), in a position further away from said force plug (11) when the half-moulds (3, 4) of said at least one pair are in an open position, enables the passage of said force plug (11) within a space between the half-moulds.

8. The device according to claim 7, in which there are provided pneumatic or electrical actuator means for displacing into a connected position and for carrying out the travel of approach and of recession of the half-moulds (3, 4) of said at least one pair.

9. The device according to claim 8, in which said actuator means actuate said connecting rod (7).

10. The device according to claim 9, in which said force plug (11) comprises undercut means (110) designed to discharge, on the two closed half-moulds of said at least one pair, the forces which, during moulding, act upon it.

11. The device according to claim 10, in which one part of said force plug (11), with the half-moulds (3, 4) of said at least one pair in a connected position, is external to the moulding cavity for being gripped by handling means.

12. The device according to claim 11, in which a moving bar (10) is provided, which is designed to carry a plurality of force plugs (11).

13. The device according to claim 1, in which a piston (5) is provided, which is operated by means of fluid under pressure and is designed to exert a force acting in the direction of closing of the half-moulds (3, 4) of said at least one pair.

* * * * *